(12) United States Patent
Marshall

(10) Patent No.: US 7,025,269 B2
(45) Date of Patent: Apr. 11, 2006

(54) BARCODES INCLUDING EMBEDDED SECURITY FEATURES AND SPACE SAVING INTERLEAVED TEXT

(75) Inventor: Richard A. Marshall, St. Louis, MO (US)

(73) Assignee: Watson Label Products Corp., St. Louis, MO (US)

(*) Notice: Subject to any disclaimer, the term of this patent is extended or adjusted under 35 U.S.C. 154(b) by 0 days.

(21) Appl. No.: 10/830,381

(22) Filed: Apr. 22, 2004

(65) Prior Publication Data

US 2004/0211844 A1    Oct. 28, 2004

Related U.S. Application Data

(60) Provisional application No. 60/465,186, filed on Apr. 24, 2003, provisional application No. 60/465,157, filed on Apr. 24, 2003.

(51) Int. Cl.
  *G06K 7/10* (2006.01)

(52) U.S. Cl. .................... 235/462.01; 235/494
(58) Field of Classification Search .......... 235/462.01, 235/462.08, 462.09, 462.12, 462.16, 494
See application file for complete search history.

(56) References Cited

U.S. PATENT DOCUMENTS

| | | | | |
|---|---|---|---|---|
| 4,667,089 A | * | 5/1987 | Shirakabe et al. | 235/462.08 |
| 4,777,357 A | * | 10/1988 | Harada et al. | 235/462.27 |
| 4,889,367 A | * | 12/1989 | Miller | 283/88 |
| 4,992,650 A | * | 2/1991 | Somerville | 235/462.1 |
| 5,109,153 A | * | 4/1992 | Johnsen et al. | 235/468 |
| 5,436,974 A | * | 7/1995 | Kovanen | 380/51 |
| 5,574,804 A | * | 11/1996 | Olschafskie et al. | 382/313 |
| 5,835,615 A | * | 11/1998 | Lubow et al. | 382/112 |
| 5,895,075 A | * | 4/1999 | Edwards | 283/81 |
| 5,939,700 A | | 8/1999 | Ackley | |
| 6,032,861 A | * | 3/2000 | Lemelson et al. | 235/456 |
| 6,286,761 B1 | | 9/2001 | Wen | |
| 6,373,965 B1 | | 4/2002 | Liang | |
| 6,398,106 B1 | | 6/2002 | Ulvr et al. | |
| 6,460,766 B1 | * | 10/2002 | Olschafskie et al. | 235/454 |
| 6,541,100 B1 | | 4/2003 | Williams et al. | |
| 6,609,728 B1 | | 8/2003 | Voerman et al. | |
| 6,742,708 B1 | * | 6/2004 | Shaked et al. | 235/462.01 |
| 2003/0098357 A1 | | 5/2003 | Cummings et al. | |
| 2004/0000787 A1 | | 1/2004 | Vig et al. | |

* cited by examiner

*Primary Examiner*—Ahshik Kim
(74) *Attorney, Agent, or Firm*—Armstrong Teasdale LLP

(57) ABSTRACT

A method for adding authentication features to a barcode is described. The barcode includes a plurality of printed parallel bars and the method includes embedding printed security features within the printed barcode. The parallel bars of the bar code are of varying width and at least one of the parallel bars has security features printed within that are printed in a color that is different than a color of the parallel bars.

36 Claims, 3 Drawing Sheets

BARCODES INCLUDING EMBEDDED SECURITY FEATURES AND SPACE SAVING INTERLEAVED TEXT

CROSS REFERENCE TO RELATED APPLICATIONS

This application claims priority of U.S. Provisional Application Ser. No. 60/465,186 filed Apr. 24, 2003, and U.S. Provisional Application Ser. No. 60/465,157 filed Apr. 24, 2003, which are hereby incorporated by reference in their entirety.

BACKGROUND OF THE INVENTION

This invention relates generally to bar coding of products and more specifically, to barcodes which include embedded security features allowing entities to be able to identify between legitimately produced barcodes and associated products and counterfeited barcodes and products.

Barcodes have been used in product identification and numerous other uses for many years. One problem with conventional barcodes is that they are not traceable to a specific source of production and therefore do not necessarily provide a means of authentication that the product identified has been legitimately produced. Another problem with conventional barcodes is that they can be reproduced using a variety of methods.

Other attempts at using barcodes to frustrate counterfeiters and provide authentication as to a source have been made. One such example has been to print text near the barcodes with invisible ink or other inks that react to some stimulus such as light at a particular wavelength (e.g., ultraviolet light). However, the result is still a bar code that is easily copied. Electronic devices have also been incorporated into products and/or their packaging. While more effective, electronic devices can be copied, and further, tend to add expense to a product. Another method is to use taggents, which are microscopic size particles or structures that are passive, but reflect electromagnetic energy in a unique and quantifiable manner when read (e.g., illuminated by a radio transceiver). Taggents also add expense and a layer of processing to a product and/or its packaging.

While conventional barcodes may be suitable for certain purposes, they are not as suitable for companies that wish to ensure that the product identified by the barcode has been legitimately produced. Known authentication methods can be unreliable, while others may add an unnecessary expense. Therefore, identifying counterfeited products is difficult and a need for easily identifying counterfeited products without incurring significant costs in so doing exists. This problem is especially pertinent in certain products areas, for example, the pharmaceutical industry, where counterfeited products could be life threatening.

BRIEF DESCRIPTION OF THE INVENTION

In one aspect, a method for adding authentication features to a barcode is provided. The barcode includes a plurality of printed parallel bars, and the method comprises embedding printed security features within the printed barcode.

In another aspect, a method is provided for adding security features to a printed barcode which includes a plurality of parallel bars of varying widths separated by spaces of varying widths. The method comprises printing a portion of the security features as a portion of the parallel bars in a color that is recognized by a scanner as being the same color as the parallel bars and printing a portion of the security features as a portion of the spaces between the parallel bars in a color that is recognized by a scanner as being the same color as the spaces between the parallel bars.

In still another aspect, a printed barcode is provided which comprises a plurality of parallel bars of varying width and a plurality of spaces of varying width, one space between each two of the parallel bars. At least one of the parallel bars comprises security features printed within, in a color that is different than a color of the parallel bars.

In another aspect, a computer program embodied on a computer readable medium for embedding security features within barcodes is provided. The computer program comprises a barcode generation source code segment configured to receive a string of alphanumeric data and generate printable data corresponding to a barcode of the alphanumeric data and a security feature generation source code segment configured to adapt the printable data to include security features for printing within the barcode.

DETAILED DESCRIPTION OF THE INVENTION

Barcodes are a universally accepted identification for many products. While there are many different types of barcode designs, all barcodes have the commonality of encoding data using alternating dark bars and light spaces, both typically of varying width, that can be decoded utilizing a barcode scanning device. Barcodes may be oriented either vertically or horizontally. Barcodes can also be produced and/or printed in various colors.

Embodiments of barcodes which include embedded security features are described herein. These barcodes are utilized to ensure the products identified by such barcodes are not counterfeited products. In certain embodiments, sometimes referred to herein as covert security barcodes, the embedded security features are invisible to the naked eye and in certain embodiments are generated in dynamic patterns utilizing a computer program product. In other embodiments, sometimes referred to herein as overt security barcodes, the embedded security features are visible to the naked eye and additionally may be utilized to reduce the footprint area needed to print a barcode and the corresponding alphanumeric characters. The overt security barcodes are also generated utilizing a computer program product.

Figure 1:
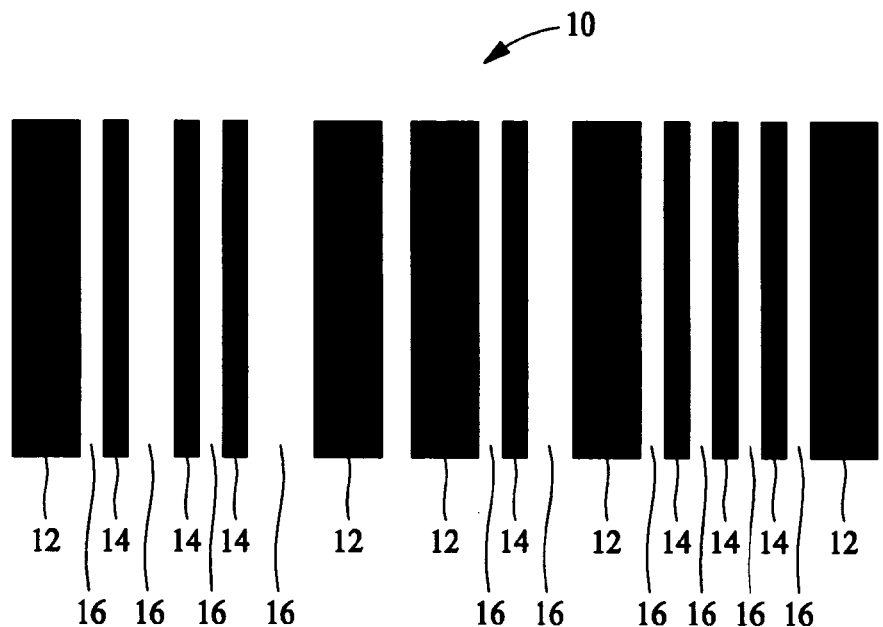
FIG. 1 illustrates a known barcode including parallel bars of varying width separated by spaces of varying width.

FIG. 1 illustrates a known barcode 10 including parallel bars of varying width separated by spaces of varying width. More specifically, the parallel bars include a plurality of wide bars 12 and a plurality of narrow bars 14. The parallel bars, (e.g., wide bars 12 and narrow bars 14) are separated by spaces 16 of varying width. Barcode 10 is typical of barcodes known in the art where the pattern of wide bars 12, narrow bars 14, and spaces 16 therebetween comprise a code which can be read using a barcode scanning device and which represent a type of code that can be deciphered by such a scanner. For example, barcode 10 might be representative of a product number that is marked on packaging containing a product, marked directly on a product, or both, depending on the nature of the product.

In known printing processes, barcodes like barcode 10 are produced using a font that prints a specific combination of bars and spaces associated with a character. For example, to print a Code 39 barcode, each character of the barcode is represented by 5 bars and 4 spaces. Such barcodes are printer independent and the printer decides what pixels to print based on algorithms associated with the particular printer. Such algorithms are thought to result in bar width variances and overlapping pixel boundaries as the algorithm generates the output that is sent to a specific printer.

The barcodes described herein are produced as printer calibrated images. For example, the printed barcodes are printed as a graphically imaged pattern of pixels related and mapped to the resolution of the printer being utilized. Therefore, every pixel in the barcode being printed (bar or space) is addressed individually. A computer program is utilized that is calibrated in a one-to-one relationship with the output printer used and every bar of the barcodes are graphically drawn starting at specific pixel positions with specific pixel widths. As a result, every barcode is created at the same size, with consistent pixel boundaries, resulting in higher quality barcodes.

Figure 2:
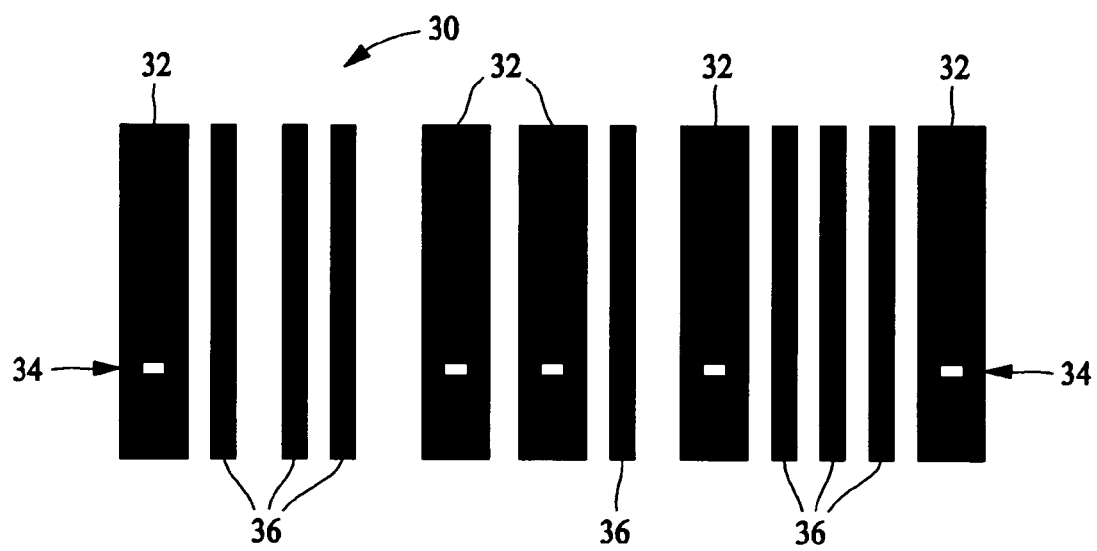
FIG. 2 illustrates the barcode of FIG. 1 including programmed printed defects in several of the parallel bars.

FIG. 2 illustrates a barcode 30 which has the same overall pattern as barcode 10 (shown in FIG. 1), but which further includes a number of defects in several of the parallel bars. Specifically and as illustrated, wide bars 32 include programmed printed defects 34, which in the example embodiment, are shaped as rectangles. Barcode 30 is one embodiment of a covert security barcode that has many of the advantages of known barcodes plus additional advantages as further described below.

Printed defects 34 can be configured as programmed lines, dots, graphics or any other geometric shape. Further printed defects 34 can be printed in one or more colors that are different than the color utilized for printing wide bars 32 and narrow bars 36 for unique identification of products. Alternatively, printed defects 34 can be configured as a lack of printed colors (e.g., a blank geometric shape within wide bars 32). Other embodiments of barcode 30 include printed defects (not shown) within narrow bars 36, but in a smaller scale than shown in FIG. 2. Still other embodiments of barcode 30 include printed defects within both wide bars 32 and narrow bars 36.

Barcode 30 is representative of any printed barcode or object that is comprised of bars and spaces. While barcode 30 illustrated as having narrow bars 36 and wide bars 32, it is known that barcodes which utilize multiple bar and space widths exist. While such barcodes are not illustrated in the Figures, utilization of the methods described herein are contemplated for use with any and all barcode configurations. Printed defects 34 are configurable to be any programmed pattern of lines, dots, graphics, or geometric shape and further can be dynamic in nature. For example and in one embodiment, printed defects 34 are generated using an algorithm within a computer program product and placed within specific bars and at specific locations within those bars of barcode 30 since an exact position of each of the bars of barcode 30 is known. As a function of a computer program product, printed defects 34, and other security feature embodiments described below, may be printed during a single pass operation of a printer, in one embodiment, from a print file.

In one example, the pattern for printed defects 34 is based on a key code. While in the illustrated embodiment, printed defects 34 are produced in all of wide bars 32, in another example, a pattern of only the 1 st, 5 th and 11 th bars (whether they be wide or narrow) of barcode 30 would contain printed defects 34. Of course many other combinations of patterns for printed defects are possible. The dynamic structure of such a pattern can be tied to a product number, a model number, a date, a job number, a secure internet inquiry, a production date, a vendor, a location, or some other key that would make the pattern for printed defects 34 completely changeable. The dynamic structure further allows multiple patterns for printed defects 34 to be generated for the same model number of product based on obscure data. As further described below, printed defects 34 can be printed using various different colors.

Whichever of the above described patterns are used for printed defects 34, which in certain applications are invisible or nearly invisible to the naked eye, the pattern can be authenticated using numerous methods, for example, a printed key code book, a secure internet inquiry into a database, a scanning device, or another decoding method. In a relatively simple embodiment, printed defects 34 may be verified by a user viewing barcode 30 through a magnifying device. The need for significant magnification for viewing printed defects 34 renders casual attempts at counterfeiting very detectable. Even if an uninformed person would think to use magnification to see the pattern for printed defects 34, he or she would assume that the barcode was simply printed with bad quality due to printed defects 34.

Figure 3:
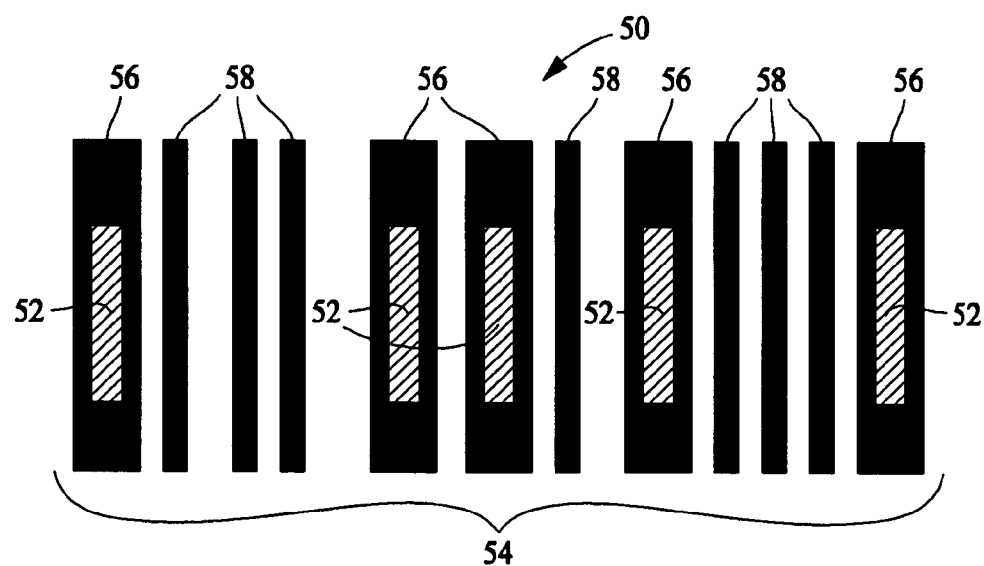
FIG. 3 illustrates the barcode of FIG. 1 including programmed printed lines within several of the parallel bars, the lines being a different color than the bars.

While shown as blank or white spaces within the individual bars of barcode 30, embodiments of printed defects are not so limited. Printed defects may be printed in any color that is different and which provides sufficient contrast with the color utilized to print the bars of the barcode. Specifically, FIG. 3 illustrates a barcode 50 which has the same overall pattern as barcodes 10 and 30 (shown in FIGS. 1 and 2 respectively). Barcode 50 includes embedded features 52 within several of parallel bars 54, embedded features 52 being a different color than parallel bars 54. Again, while in the illustrated embodiment, embedded features 52 are produced in all of wide bars 56, many other combinations of patterns for embedded features 52 within one or more of wide bars 56 and narrow bars 58 are possible.

Barcode 50 is functionally equivalent to barcode 30 (shown in FIG. 2) and numerous patterns, sizes, and shapes for embedded features 52 can be programmed as described above with respect to barcode 30. Barcode 50 further illustrates that embedded features 52 can be printed in various colors (distinguished from white or blank by the crosshatching). More specifically, embedded features 52 are printed in a color that is distinguishable from the color of the bars by a person viewing barcode 50, but not distinguishable by a scanning device used to read barcode 50. By way of example, for a barcode where parallel bars 54 are printed as black, embedded features 52 are printed in a color that a barcode scanner interprets as black. Many known barcode scanners "see" the color cyan as black. While it is certainly possible to print embedded features 52 in colors that barcode scanners do not see as black, such colors, depending on a size of embedded features 52, may render barcode 50 unfit for scanning. The larger size (compared to printed defects 34 shown in FIG. 2) of embedded features 52 in barcode 50 may allow for possible identification with the naked eye, but in certain applications embedded features 52 are still invisible to the naked eye.

Figure 4:
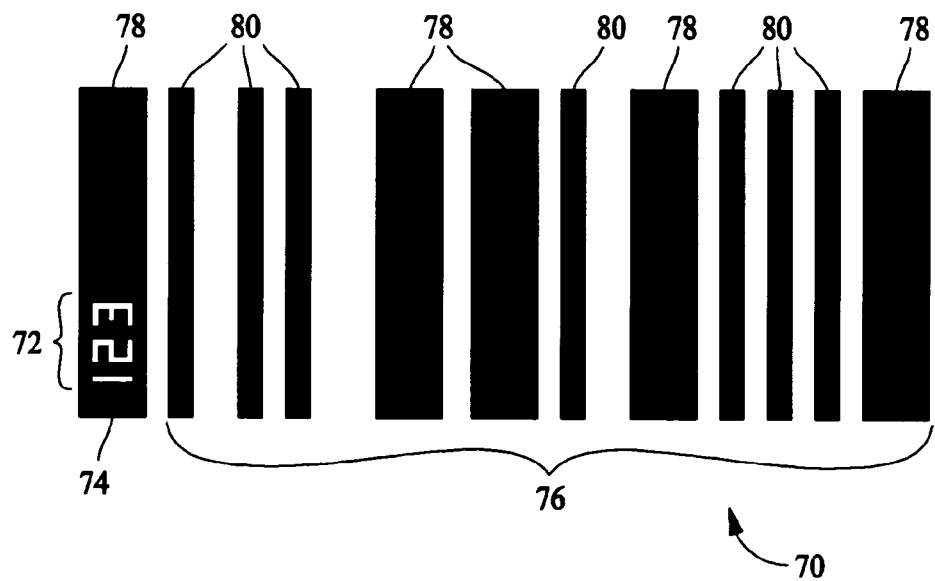
FIG. 4 illustrates the barcode of FIG. 1 including programmed printed alphanumeric characters within one of the parallel bars, the alphanumeric characters being a different color than the bars.

FIG. 4 illustrates a barcode 70 which has the same overall pattern as barcodes 10, 30 and 50 (shown in FIGS. 1, 2, and 3 respectively). Barcode 70 includes printed alphanumeric characters 72 within parallel bar 74, with alphanumeric characters 72 being a different color than a color of parallel bar 74 and the rest of parallel bars 76. By way of example, if "123" company wanted their name to be within their barcode, the text "123" would appear like any other graphic above described. To ensure that barcode scanners could successfully read barcode 70, alphanumeric characters 72 would be printed in a color that barcode scanners interpret as black, such as cyan for black parallel bars. While alphanumeric characters 72 are shown within one of wide bars 78, embodiments of alphanumeric characters 72 within narrow bars 80 are also contemplated. In addition, dynamic patterns of alphanumeric characters 72 are also contemplated using algorithms similar to those described above. Depending on sizes of the patterns, barcodes 50 and 70 may be considered covert or overt, depending on a visibility to the naked eye.

Figure 5:
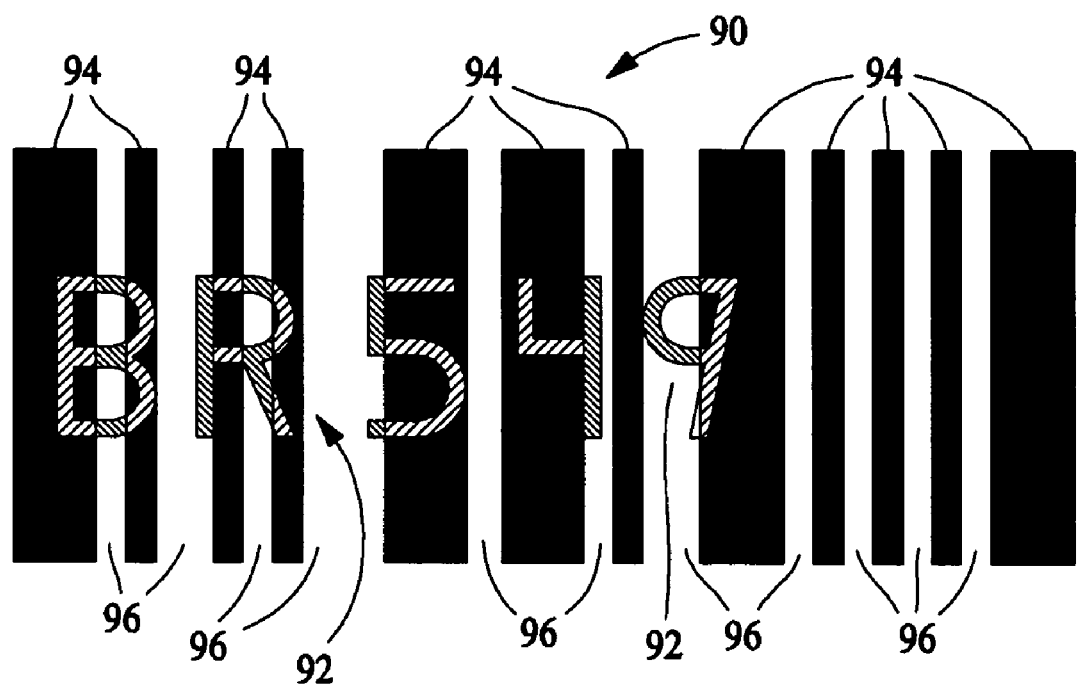
FIG. 5 illustrates the barcode of FIG. 1 including alphanumeric characters interleaved with the parallel bars.

FIG. 5 illustrates a barcode 90 which includes alphanumeric characters 92 interleaved with parallel bars 94 and spaces 96 between parallel bars 94. Barcode 90 is representative of any printed barcode or object that includes parallel bars 94 (lines) and spaces 96 and is an overt security barcode. Alphanumeric characters 92 include text in any font or other graphic characters that can be interleaved with barcode 90. In the illustrated embodiment, where a portion of alphanumeric characters 92 intersect an area that would normally be a portion of a parallel bar 94, that portion of the alphanumeric characters 92 are printed in a color that a barcode scanner interprets as black, such as cyan when parallel bars 94 are printed in black. Where a portion of alphanumeric characters 92 intersect an area that would normally be a portion of spaces 96 in between two parallel bars 94, that portion of the alphanumeric characters 92 are printed in a color that the barcode scanner ignores or filters out, such as magenta. The different portions of alphanumeric characters 92 are shown as having different crosshatch patterns representative of different printed colors.

Most scanners see cyan as black and magenta as blank (or white). Printing barcode 90 in such a fashion allows for a visual identification of a code (represented in FIG. 5 by alphanumeric characters 92), while still allowing scanning of barcode 90 by most known scanning devices. In addition, the configuration of barcode 90 allows for a space reduction for barcodes in applications where the character string represented by the barcode is printed in proximity to the barcode. In such an embodiment, the embedded security features (e.g., alphanumeric characters 92) are visible to the naked eye and additionally may reduce the footprint area needed to print barcode 90 and the corresponding alphanumeric characters 92.

For example, if a company wanted a serial number (e.g., BR549) to be interlaced within their barcode, the text "BR549" would appear like any other graphic. As illustrated, the portion of "BR549" intersecting parallel bars 94 is printed in a color that the barcode scanner interprets as black, such as cyan for black parallel bars. The portion of "BR549" intersecting spaces 96 would be printed in a color that the scanner ignores or filters out, such as magenta for white spaces between parallel bars 94. Other color combinations for the interleaved text within barcodes are also possible, depending on operation (color recognition capability) of the scanning devices.

The position of alphanumeric characters 92 interleaved with parallel bars 94 and spaces 96 is based, at least in part, on the specific parallel bars 94 and spaces 96 of each individual barcode. In one embodiment, an exact location and width of each parallel bar 94 and space 96 is determined and alphanumeric characters 92 are portioned and printed in such a manner that the color used for the portions of alphanumeric characters 92 placed in spaces 96 between parallel bars 94 is ignored or filtered out by the scanner, such as magenta, and the portions within parallel bars 96 is interpreted as black, such as cyan. The resulting barcode 90 with the embedded pattern (e.g., alphanumeric characters 92) would appear to be a normal barcode. Various pattern graphics are also contemplated. In one embodiment, alphanumeric characters 92 are utilized as a check number that is, for example, unique to the barcode number.

As described above, the printer software is calibrated to know each and every pixel that is designated to represent a bar and each and every pixel that is meant to designate a space. Therefore a font, for example "BR549", of alphanumeric characters 92 is sliceable in such a manner that a specific color to the portions of the characters that utilize the same space as the bars 94 can be assigned and a specific color to the portions of the characters that utilize the same space as the spaces 96 can be assigned.

With respect to the above descriptions for covert security barcodes (FIG. 2) and overt security barcodes (FIGS. 3–5), it is to be realized that the optimum dimensional relationships for the various portions of the security barcodes include variations in size, materials, shape, form, function, manner of operation, assembly and use. The above descriptions apply to any printed barcode or object that includes bars (lines) and spaces. It should also be understood that various descriptions for features within the barcodes, for example, printed defects, alphanumeric characters, and embedded features may be collectively referred to as security features.

In addition, the above described color combinations for the printing of the covert and overt security barcodes are examples only. It is contemplated to print on backgrounds other than white. For example, if the background color is some color other than white, then the portion of the interleaved text that occupies the spaces of the barcode could be white thus rendering white characters. Other combinations of colors or absence of colors can be incorporated into the printed defects, alphanumeric characters, embedded features, and characters interleaved in the spaces and bars of barcodes.

The covert and overt security barcodes described herein (e.g., barcodes 30, 50, 70, and 90 (shown in FIGS. 2–5 respectively)) allow manufacturers to authenticate their products by first substantiating the presence of a pattern within or interleaved within the barcode and then decoding the pattern for verification of product authenticity. Since the patterns within the barcodes can be dynamic, the same model product could have a different covert pattern based on numerous criteria as described above. The security barcodes allow users to identify products by scanning the barcode and verify their legitimacy with the covert pattern, thereby also identifying counterfeited products. The covert security barcode, as above described, is invisible or at least nearly invisible to the naked eye. Overt security barcodes, as above described, are visible to the naked eye. Some versions of overt security barcodes are wholly contained within the parallel bars of the barcode (e.g., barcodes 50 and 70) and are verified using the same techniques utilized to verify the covert security barcodes.

Other overt security barcodes include, for example, alphanumeric characters interleaved with the parallel bars and spaces of the barcode (e.g., barcode 90). Where the alphanumeric characters intersect the parallel bars of the barcode, that portion of the alphanumeric characters are printed in a color that the scanner interprets as part of the parallel bar (e.g., black), for example, cyan is interpreted as black by some barcode scanners. Where the alphanumeric characters intersect the spaces between the parallel bars of the barcode, that portion of the alphanumeric characters are printed in a color that the scanner filters out (e.g., interprets as a space between parallel bars), for example, cyan is filtered out by some barcode scanners. While referred to herein for simplicity as the bars being black and spaces in between being white, bar code scanners measure a reflectance of the bars and spaces of barcodes. The bar code scanners measure what is sometimes referred to as a print contrast signal which is a value of the changes in reflectivity between the dark bars and the light spaces as read by the bar code scanner.

The preceding descriptions of barcodes incorporating security features are adaptable for utilization on a multitude of printers as every printer has specific commands that would render the above described barcodes. For example, any printer capable of printing pixels or dots can be utilized to print the barcode and the security features therein. Examples of such printers include, but is not limited to, thermal transfer, dot matrix, laser, ink jet, Hewlett Packard's Indigo digital printing presses, and similar machines. All of these printer types utilize printer driver software which results in a data input stream that produces a printer calibrated image in specific pixel or dot locations on the printed material. These data input streams are either unique to the individual printer or universal in the case of postscript printing.

Therefore, the foregoing is considered as illustrative only of the principles of the invention. It is to be understood that the invention is not limited in its application to the details of construction and to the arrangements of the components set forth in the foregoing description or illustrated in the drawings. The invention is capable of other embodiments and of being practiced and carried out in various ways and numerous modifications and changes will readily occur to those skilled in the art. Also, it is to be understood that the phraseology and terminology used herein are for the purpose of description only and should not be construed as limiting. Therefore, while the invention has been described in terms of various specific embodiments, those skilled in the art will recognize that the invention can be practiced with modification within the spirit and scope of the claims.

What is claimed is:

1. A method for adding authentication features to a barcode, the barcode including a plurality of printed parallel bars with a space therebetween, said method comprising embedding one or more alphanumeric characters within one or more individual bars of the printed barcode.

2. A method according to claim 1 wherein embedding one or more alphanumeric characters comprises printing a pattern of alphanumeric characters within one or more of the parallel bars of the barcode.

3. A method according to claim 1 further comprising printing the alphanumeric characters in a color that is recognized as the same color as the parallel bars by a scanning device.

4. A method according to claim 1 wherein embedding one or more alphanumeric characters within the printed barcode comprises not printing a portion of one or more of the parallel bars of the printed barcode.

5. A method according to claim 1 further comprising embedding one or more geometric figures within one or more of the parallel bars of the barcode.

6. A method according to claim 1 wherein embedding one or more alphanumeric characters within the printed barcode comprises embedding a programmed pattern of alphanumeric characters within specific parallel bars of the barcode.

7. A method according to claim 1 wherein the alphanumeric characters comprise one or more of a product number, a check number, a serial number, a location, a date, a job number, and a part number.

8. A method according to claim 1 wherein embedding one or more alphanumeric characters comprises embedding a pattern generated from an algorithm.

9. A method according to claim 1 comprising printing the alphanumeric characters and the parallel bars of the barcode in a single printing pass.

10. A method according to claim 1 comprising embedding the alphanumeric characters within a print file such that the alphanumeric characters and the parallel bars of the barcode are printed in a single printing pass.

11. A method according to claim 1 comprising producing the barcodes as printer calibrated images.

12. A method according to claim 11 wherein producing the barcodes as printer calibrated images comprises:
mapping each barcode bar and space to be printed as a pattern of pixels; and
addressing each pixel of the barcode individually, each pixel being a portion of one of a bar of the barcode, a space between bars of the barcode, or an alphanumeric character embedded within the barcode.

13. A method according to claim 1 comprising:
determining specific pixel positions for each alphanumeric character to be embedded within the bars of the barcode; and
drawing every bar of the barcode and every embedded alphanumeric character within the bars of the barcode starting at specific pixel positions with a specific pixel width.

14. A printed barcode comprising:
a plurality of parallel bars, said parallel bars of varying width, at least one of said parallel bars comprising security features printed within one or more individual bars of the printed barcode, said security features comprising one or more alphanumeric characters printed in a color that is different than a color of said parallel bars; and
a plurality of spaces of varying width, one said space between each two of said parallel bars.

15. A printed barcode according to claim 14 wherein said alphanumeric characters are printed in a color that is recognized as the same color as said parallel bars by a scanning device.

16. A printed barcode according to claim 14 further comprising one or more geometric figures printed within one or more of said parallel bars.

17. A printed barcode according to claim 16 wherein one or more of said geometric figures extend across portions of one or more of said parallel bars and portions of one or more of said spaces.

18. A printed barcode according to claim 17 wherein portions of said geometric figures that extend across said parallel bars are printed in a color that is recognized as the same color as said parallel bars by a scanning device and portions of the features that extend across said spaces are printed in a color that is recognized as the same color as said spaces by a scanning device.

19. A printed barcode according to claim 14 wherein said one or more alphanumeric characters extend across portions of one or more of said parallel bars and portions of one or more of said spaces.

20. A printed barcode according to claim 19 wherein portions of said alphanumeric characters that extend across said parallel bars are printed in a color that is recognized as the same color as said parallel bars by a scanning device and portions of the features that extend across said spaces are printed in a color that is recognized as the same color as said spaces by a scanning device.

21. A printed barcode according to claim 19 wherein at least a portion of said alphanumeric characters correspond to the characters described by said barcode or a check number associated with the barcode.

22. A printed barcode according to claim 14 wherein said barcode is produced as a printer calibrated image.

23. A printed barcode according to claim 14 wherein said parallel bars, said alphanumeric characters, and said spaces are mapped as a pattern of pixels.

24. A printed barcode according to claim 23 wherein each pixel of said barcode is addressed individually.

25. A printed barcode according to claim 14 comprising:
individually determined pixel positions and pixel widths for starting each said parallel bar of said barcode; and individually determined pixel positions for each said alphanumeric character embedded within said barcode.

26. A computer program embodied on a computer readable medium for embedding security features within barcodes, comprising:
a barcode generation source code segment configured to receive a string of alphanumeric data and generate printable data corresponding to a barcode representative of the alphanumeric data; and
a security feature generation source code segment configured to adapt the printable data to include security features that include at least one alphanumeric character for printing within bars of the barcode, said security feature generation source code segment configured to cause the security features to be printed within bars of the barcode in a color that is different than a color of the bars of the barcode.

27. A computer program according to claim 26, wherein said security feature generation source code segment causes the security features to be printed within the barcode in a color that is recognized by a scanning device as the same color as the barcode.

28. A computer program according to claim 26 wherein said security feature generation source code segment generates security features which comprise one or more geometric figures printed within the barcode.

29. A computer program according to claim 26 wherein said security feature generation source code segment generates security features which comprise one or more geometric figures which extend across portions of bars and spaces between bars of the barcode.

30. A computer program according to claim 29 wherein said security feature generation source code segment generates portions of the geometric figures that extend across the bars of the barcode in a color that is recognized as the same color as the bars of the barcode by a scanning device and portions of the features that extend across the spaces of the barcode in a color that is recognized as the same color as the spaces by the scanning device.

31. A computer program according to claim 26 wherein said security feature generation source code segment generates security features such that the one or more alphanumeric characters extend across portions of bars and spaces between bars of the barcode.

32. A computer program according to claim 31 wherein said security feature generation source code segment generates portions of the alphanumeric characters that extend across the bars of the barcode in a color that is recognized as the same color as the bars of the barcode by a scanning device and portions of the features that extend across the spaces of the barcode in a color that is recognized as the same color as the spaces by the scanning device.

33. A computer program according to claim 31 wherein at least a portion of the alphanumeric characters correspond to the alphanumeric data described by the barcode or a check number associated with the barcode.

34. A computer program according to claim 26 wherein the printable data is produced as a printer calibrated image.

35. A computer program according to claim 26 wherein said barcode generation source code segment and said security feature generation source code segment are configured to map the barcode and the alphanumeric characters as a pattern of pixels.

36. A computer program according to claim 35 wherein said barcode generation source code segment and said security feature generation source code segment are configured to address each pixel of the barcode individually.

* * * * *